UNITED STATES PATENT OFFICE.

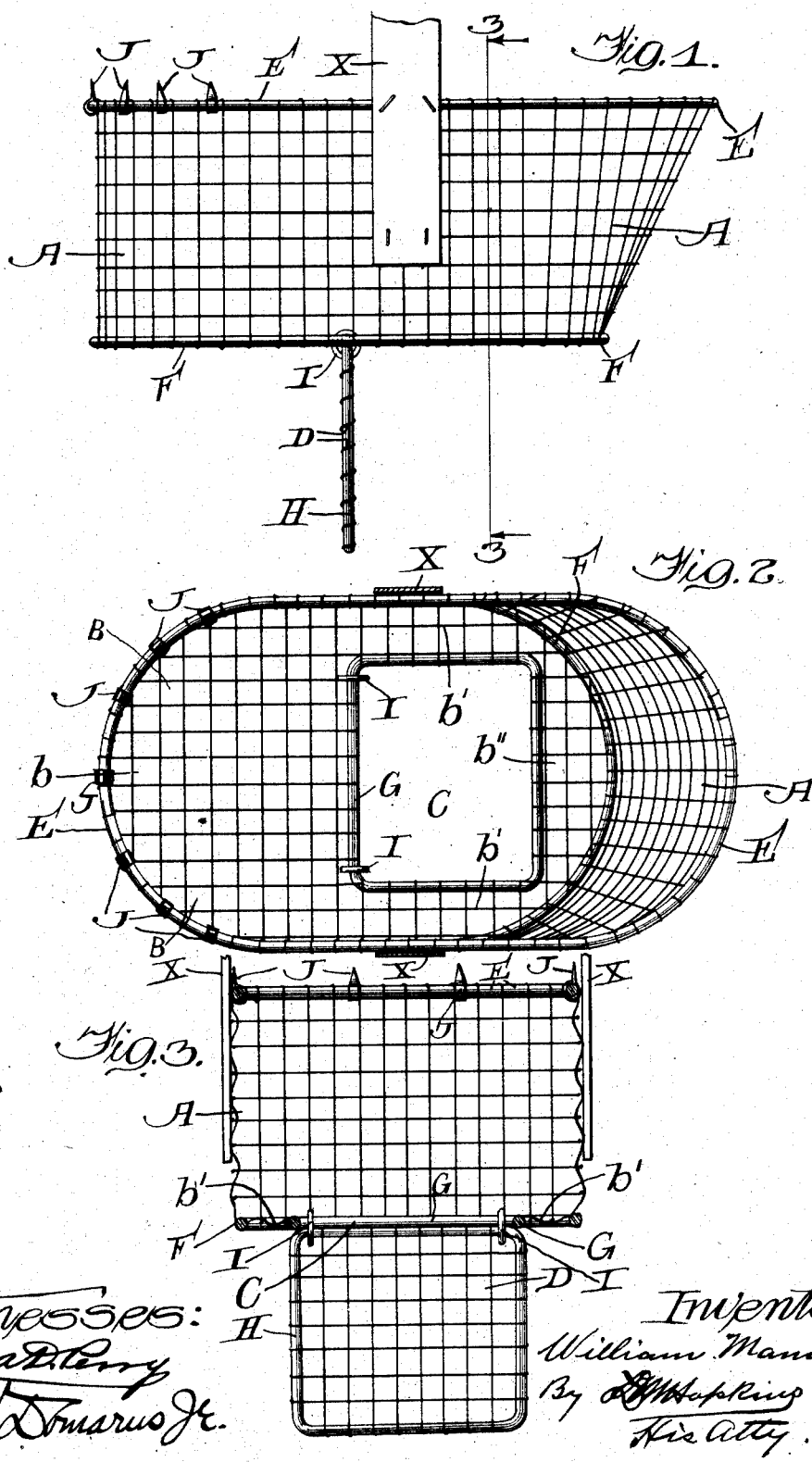

WILLIAM MANN, OF BALJEANNIE, SASKATCHEWAN, CANADA.

CALF-WEANER.

No. 927,258.     Specification of Letters Patent.     Patented July 6, 1909.

Application filed December 16, 1907, Serial No. 406,826. Renewed March 22, 1909. Serial No. 484,995.

*To all whom it may concern:*

Be it known that I, WILLIAM MANN, a subject of the King of Great Britain, residing at Baljeannie, Saskatchewan, Canada, have invented certain new and useful Improvements in Calf-Weaners, of which the following is a specification.

The object of the invention is to provide a calf weaner which will absolutely and positively prevent the animal from nursing or eating any food that is not on the ground but which will permit it to graze or eat any food that is on the ground.

To this end the invention consists in the features of novelty that are hereinafter described with reference to the accompanying drawing, which is made a part of this specification, and in which:

Figure 1 is a side elevation of the improved weaner with its bottom in horizontal position and the door open. Fig. 2 is a plan view thereof. Fig. 3 is a vertical transverse section thereof on the line 3—3, Fig. 1.

The weaner comprises a body portion A, a bottom B, which is preferably flat and has through it an opening C, and a door D for covering or uncovering said opening, according to the position which the weaner for the time being occupies, a head stall of any suitable construction being provided (a portion of which is shown at X) for holding the weaner on the calf's nose. The body is preferably made of woven wire netting of any desired mesh secured at top and bottom to frames E and F made of heavy wire. The netting may be secured to the frames by any suitable means, but preferably it is secured by having the ends of its individual wires bent around the wires of the frames, respectively. The bottom is made of similar wire netting, and is similarly secured to the bottom frame F. Surrounding the opening C is a frame G, to which the wires of the bottom extending to the opening are similarly secured. The door, also is made of similar wire netting similarly secured to a frame H and is hinged to the bottom at the front side of the opening by rings I, embracing adjacent wires of the frames G and H.

The body of the weaner is elongated from front to back, and the opening is of less length and of less width than the bottom and is located in the rear portion thereof, so as to leave a large portion $b$ in front of it, portions $b'$, $b'$, at its sides, and a portion $b''$ in rear of it.

With a weaner of this construction, when the animal lowers its head the door will open by gravity and permit it to graze or eat other food that is on the ground. When the animal lifts its head its nose will naturally move into the forward part of the weaner so that its mouth is away from the opening and opposite the forward portion $b$ of bottom. This in itself would be sufficient to prevent nursing if it were not for the fact that calves have a fashion of manipulating weaners so as to circumvent them. Because of this the opening and the door for closing it are made of less width than the bottom. Weaners have heretofore been made with hinged bottoms, coextensive with walls of the body but it is found in practice that the calf can and does so manipulate them as to be able to nurse. Actual use has shown that this is impossible with a weaner constructed as above described, and this is due largely to the fact that the opening and door are of less width than the bottom of the weaner. Furthermore, with the improved weaner, a calf may be turned loose in a corn field with the assurance that it cannot feed on the growing corn, although it may feed on whatever is on the ground.

Preferably a number of spurs J are arranged at the front side of the weaner.

What I claim as new and desire to secure by Letters Patent is:

1. A calf weaner having a body portion, a bottom provided with an opening through it and a door hinged to the bottom at the front side of the opening.

2. A calf weaner having a body portion, a bottom having an opening through it and a door hinged to the bottom at the front side of the opening, the opening and door being of less width than the bottom.

3. A calf weaner having an elongated body portion, an elongated bottom having an opening through its rear portion, and a door hinged to the bottom at the front side of the opening.

4. A calf weaner having an elongated body portion, an elongated bottom having an opening through its rear portion and a door hinged to the bottom at the front side of the opening, said opening and door being of less width than the body portion.

5. A calf weaner having a body portion, a bottom having an opening through it and a door hinged to the bottom at the front side of said opening, the opening and door being of less length and of less width than the bottom, the opening being so located as to leave portions of the bottom on all sides of it.

WILLIAM MANN.

Witnesses:
 MARY ANN TRULY SARGEANT,
 HENRY FREDERICK SARGEANT.